United States Patent [19]
Takahashi et al.

[11] 4,303,032
[45] Dec. 1, 1981

[54] PROCESS FOR FORMING CAN BODIES

[75] Inventors: Yuzo Takahashi; Yoshinari Maeda; Yasuyuki Tanaka; Kastumi Nagai; Shiro Oyama, all of Iwatsuki, Japan

[73] Assignee: Hokkai Can Co., Ltd., Tokyo, Japan

[21] Appl. No.: 136,489

[22] Filed: Apr. 3, 1980

Related U.S. Application Data

[62] Division of Ser. No. 14,619, Feb. 23, 1979, Pat. No. 4,226,201.

[30] Foreign Application Priority Data

Mar. 14, 1978 [JP] Japan .................................. 53-29435

[51] Int. Cl.³ ............................................. B21D 51/26
[52] U.S. Cl. ........................ 113/116 QA; 113/120 F; 113/120 Y; 156/203

[58] Field of Search .................. 72/51, 52; 228/173 F; 156/203, 218; 113/120 F, 120 Y, 8, 11 R, 11 A, 12, 14 R, 14 A, 116 QA

[56] References Cited

U.S. PATENT DOCUMENTS 3,912,568  10/1975  Veno et al. ...................... 156/218 X
4,106,420   8/1978  Takahashi ............................ 113/12

Primary Examiner—Mark Rosenbaum
Attorney, Agent, or Firm—Stevens, Davis, Miller & Mosher

[57] ABSTRACT

In a can body forming process and equipment therefor, the cooling action to be added to the joining portions at the opposite ends of a can body blank is effected only at the lower part of the can forming cylinder so that said joining portions can be joined substantially without undergoing internal strain and with a higher forming accuracy.

1 Claim, 7 Drawing Figures

PROCESS FOR FORMING CAN BODIES

This is a division of application Ser. No. 14,619 filed Feb. 23, 1979, now U.S. Pat. No. 4,226,201.

BACKGROUND OF THE INVENTION

The present invention relates to a can body forming process and equipment therefor in which the opposite ends of a can body blank of a metal sheet are joined together with thermoplastic organic polymer adhesive to be formed into a can body and, more particularly, to such a process and equipment which can produce a sound can body joint substantially free from internal strain and which can maintain a high forming accuracy without requiring any particular adjustment so as to always ensure forming of correct can bodies.

Recently, as containers of carbonated beverages and fruit juice beverages, so-called lapped-seam cans made of tin-free steel and having their body seam joined in a lapped state with adhesive of thermoplastic organic polymer have come to be used in large quantities.

As compared with soldered cans which have been used from very early days, the lapped-seam cans using adhesive are hygienically advantageous because fine particulate solder does not deposit on the inside of cans. Further, in the lapped-seam cans, cost can be reduced remarkably because tin-free steel is used, and printing can be made almost at any parts of their outside surface because they do not require a varnish-free zone required in the case of soldered cans. However, it is required for the lapped-seam cans that the conditions under which the adhesive is heated, pressure-bonded and cooled should be determined and controlled more severely as compared with the former.

That is to say, in most cases, polyamide adhesive films are used as the thermoplastic organic polymer adhesive, and such adhesive films can produce sound adhesion if suitable conditions are selected. However, if fine water drops are deposited on the adhesive film, bubbles may possibly be formed in the adhesive layer due to evaporation of such water drops occurrable through the steps of heating, melting and contact-bonding of the adhesive.

If such defects as bubbles exist in the adhesive layer, for example, at upper and lower ends of the can body, since the adhesive layer is broken by the can body flanging and succeeding can end seaming steps, minute through-holes will be formed in the adhesive layer, thus causing bacterial contamination of the can content or so-called micro-leak, namely, exudation of the contents. Also, if the bubbles exist in the adhesive layer in its middle portion of the can body, the side seam of the can body may be separated apart and the contents may be leaked out when the internal pressure of the can is increased with the filled carbonated beverage.

As a method proposed so far for manufacturing the aforementioned lapped-seam cans, a can body blank having its opposite ends coated with polyamide adhesive films is first brought into contact with a can body forming cylinder which is under forcibly-cooled conditions over the entire length thereof. Then, said opposite ends as they are cooled from inside are with high frequency induction heating heated and lapped one on the other, and the thus overlapped portions are hammered with a forcibly liquid-cooled hammer to quench and cure the adhesive. However, in the aforementioned method according to the prior art, since the can forming cylinder is forcibly cooled over the entire length thereof, the can body blank transferred in close contact with the cylinder is always in a cooled state. Therefore, to raise the temperature of the polyamide adhesive coated on the opposite ends of the blank to a temperature higher than 230° C. required for melting the adhesive, the heating time must be longer than that of a blank at normal temperatures. If the high frequency induction heating voltage is increased to shorten the heating temperature, the adhesive can be heated in a very short time, but a great undulated deformation occurs at end portions of the blank and even contact-bonding becomes impossible due to a large temperature difference existing between the end and middle portions. Further, the aforementioned prior art method has the following shortcomings.

That is to say, the forced-cooling causes frost on the surface of the can body forming cylinder.

If such frost deposits on the surface of the can body forming cylinder, since frost also deposits on the can body blank when being transferred along the forming cylinder and water drops are condensed in the adhesive, the water drops cause foam therein and reduce the adhesive strength and, thus, it is impossible to maintain the accuracy of the cylinder diameter and, consequently, the diameter of the can body blank transferred in a state wound around the cylinder becomes unstable. Therefore, an excessive force will be exerted thereto in the flanging and can end seaming steps succeeding to the can body forming process and the lapped joint may be accidentally broken or the rolled portions may be creviced, causing accidental leakage.

SUMMARY OF THE INVENTION

The present invention has been achieved with a view to overcoming the aforementioned shortcomings of prior art can body forming process and equipment and has its object to provide an improved can body forming process and equipment which can produce can bodies having a stable quality and joints free from separation and micro-leak.

DETAILED DESCRIPTION OF THE PREFERRED EMBODIMENTS

Hereinafter, the present invention will be described in detail by way of the preferred embodiments thereof with reference to the accompanying drawings, in which.

Figure 1:
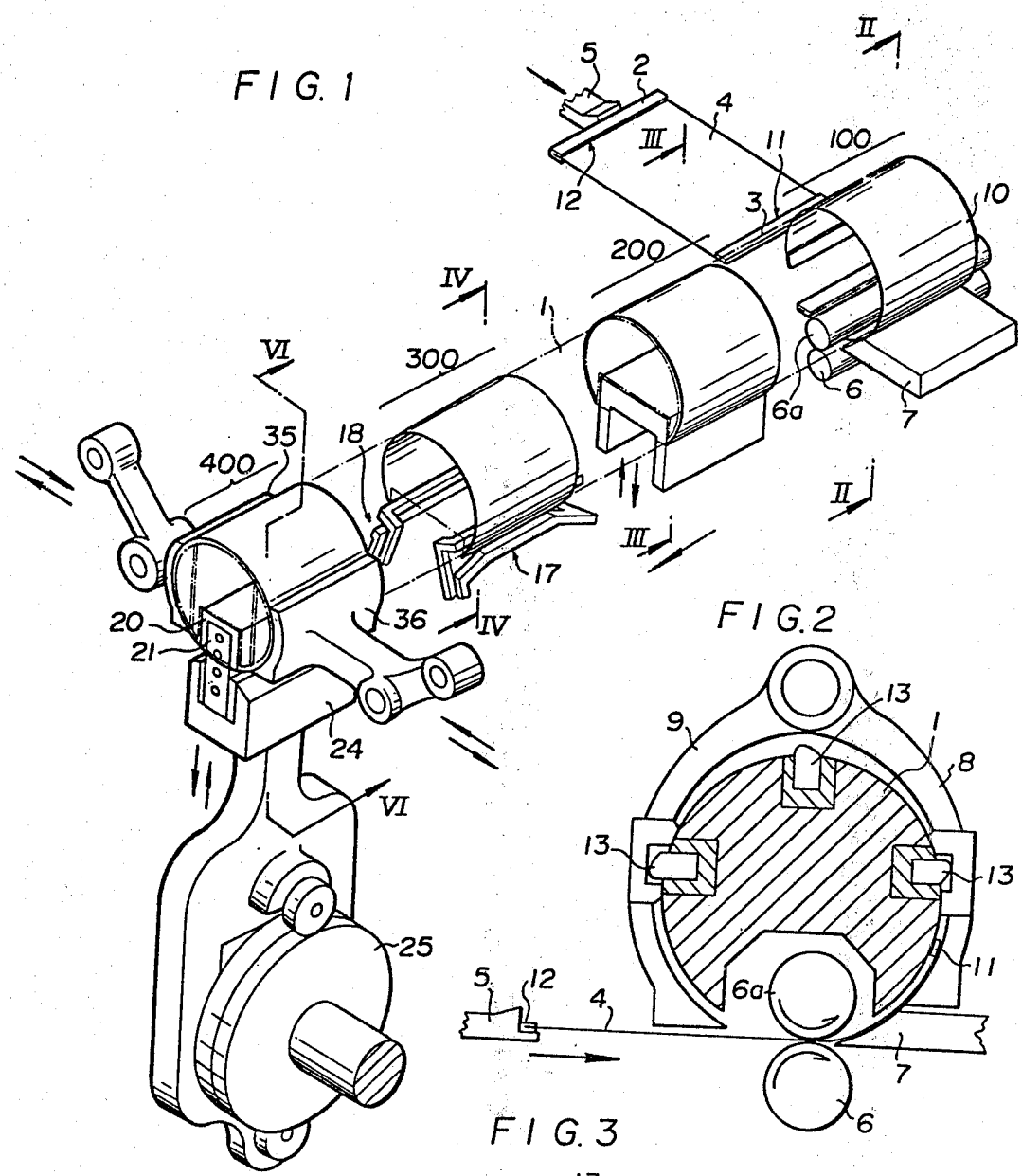
FIG. 1 is a broken down schematic oblique view of an equipment embodying the present invention showing each processing step, in which the cylinder and some other members are omitted.

Referring now to the drawings, especially, to FIG. 1, the can body forming cylinder 1 has a continuous length from the rightmost to leftmost ends, but it is shown by chain lines to illustrate the state of the can body in each processing step.

At the end of the starting side of the cylinder 1, provided is a can body forming section 100, and bending section 200 is provided at a position somewhat spaced apart from the forming section 100. Further, a heating section 300 is provided at a position somewhat spaced apart from the bending section 200, and a can body completing section 400 is provided at the ending end of the cylinder 1.

Also, at the forming section 100 at the starting end of the cylinder 1, provided on the outside thereof is a feeding mechanism 5 which feeds a can body blank into the cylinder 1 in such a manner that the can blank is rolled up around the outer periphery of the cylinder 1. Beneath the cylinder 1, a pair of feed rolls 6 and 6a are provided. One roll 6 is disposed externally of the cylinder 1, while the other roll 6a is disposed internally thereof, and these two rolls are in contact with each other at a point on the circumferential line of the cylinder 1. On the opposite side of the feeding mechanism 5, a deflecting steel guide 7 is provided on the tangential line of the rolls 6 and 6a. 8 and 9 are friction wings provided along the outer periphery of the cylinder 1.

In the bending section 200 provided somewhat spaced apart from the aforementioned forming section 100, a stationary die 14 is provided internally of the cylinder 1, and a vertically movable die 15 is provided externally of the cylinder 1 at a position directly below the aforesaid stationary die 14.

In the heating section 300, high-frequency induction heating coils 17 and 18 are provided under the cylinder 1. The opposite ends of the can body blank 4 fed from the aforementioned bending section 200 are brought into positions corresponding to the coils 17 and 18, respectively.

In the can body completing section 400 provided at the ending end of the cylinder 1, a spline 19 having a length corresponding to that of a specific can body to be formed is cut in the under side of the cylinder 1. A cooling and pressure-receiving part 21 is provided internally of the spline 19 via a heat-insulating material 20. The cooling and pressure-receiving part 21 has two through-holes 23 and its lower end face 22 is exposed outside. Beneath the cylinder 1, a hammer 24 is provided oppositely to the lower end face 22 of the pressure-receiving part 21 so that it is moved up and down by the action of a positive motion cam 25.

The hammer 24 has at its upper part a recess 26, in which a striking part 28 is provided via a heat-insulating material 27. The upper end face 29 of the striking part 28 strikes the opposite ends 11 and 12 of an almost cylindrical body 10 cooperatively with the lower end face 22 of the cooling and pressure-receiving part 21 to cool and adhesively join said ends 11 and 12 together. Said striking part 28 has therein two through-holes 30.

In the can body completing section 400, the cylinder 1 has at its opposite lateral sides semicircular parts 31 and 32. The semicircular parts 31 and 32 each has a void 34a at the center thereof, respectively. In the void 34a, provided is a spring engaging pin 34b having its one end secured to the body of the cylinder 1. On the spring engaging pin 34b, a spring 34 is provided between the head 34c of the pin 34b and a spring rest 34d formed on the semicircular part 31 or 32, respectively.

While, at the inner central part of the cylinder 1 in the can body completing section 400, provided is an expander pin 33 which is slidably movable. The pin 33 is slightly tapered towards its foremost end. At a position on the cylinder 1 advanced from the spring 34, a block 35 is secured to the semicircular parts 31 and 32, respectively.

The block 35 is sized in such a manner that it does not push outwardly the semicircular parts 31 and 32 when it is placed at a position corresponding to the reduced section of the expander pin 33, while it pushes outwardly the semicircular parts 31 and 32 when it is placed at a position corresponding to the enlarged section of the expander pin 33 at its rear end.

In the foregoing arrangement, the semicircular parts 31 and 32 are pushed outwards through the block 35 by a longitudinal sliding motion of the expander pin 33, namely, when it is moved forwards. While, it returns to its initial position when the pin 33 is retracted to a position where the block 35 corresponds to the reduced section of the pin 33.

On the opposite lateral sides of the cylinder 1 in the can body completing section 400, closing molds 36 and 36a are provided. While, on the top of the cylinder 1, a horn support 37 is provided. The spaces 38 and 39 defined by the hammer 24, closing molds 36 and 36a, horn support 37 and ending end of the cylinder 1 constitute a contact-bonding section for the can body blank 4 which is formed into almost a cylindrical shape.

The advantageous features of the method according to the present invention using the equipment having the aforementioned arrangement are that all parts of the cylinder 1 excepting the lower part thereof in the can body completing section 400 are exposed to the atmosphere to be left as it is naturally cooled without any particular temperature-retaining or cooling means and that the bending process in the bending section 200 and the contact-bonding process in the final can body completing section 400 are provided. Other advantageous features of the present invention will become clear in the following description of the respective processing steps.

Figure 2:
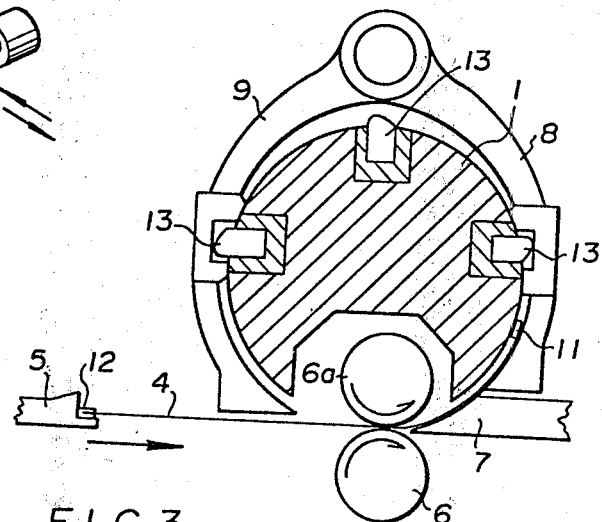
FIG. 2 is a section taken on the line II—II of FIG. 1.

Before the blank 4 is fed into the forming section 100, adhesive films 2 and 3 of thermoplastic organic polymer are attached to both sides of the opposite ends of the can body blank 4 of tin-free steel strip sheet by means of an adhesive film attaching device (not shown). In the forming section 100, the can body blank 4 is formed into almost a cylindrical body 10 along the cylinder 1 by the function of the feeding mechanism 5 under the guidance of the feed rolls 6 and 6a, deflecting steel guide 7 and friction wings 8 and 9, as shown in FIG. 2. The movement of each member of this section of the equipment is controlled so that the opposite ends 11 and 12 of the blank 4 to which the adhesive films 2 and 3 are attached is positioned under the cylinder 1 when the cylindrical body 10 is formed.

The cylindrical body 10 thus formed in the forming section 100 is then transferred to the succeeding bending section 200 by a feeding pawl 13 which slides along the surface of the cylinder 1.

Figure 3:
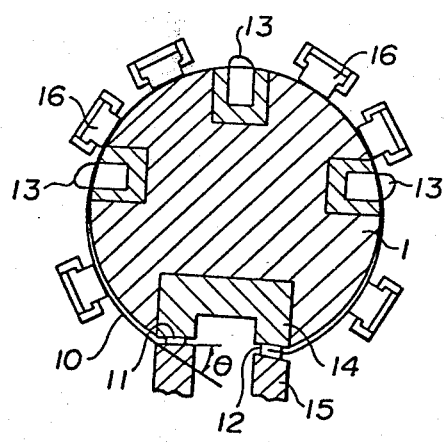
FIG. 3 is a section taken on the line III—III of FIG. 1.

In the bending section 200, the cooperating action of the stationary mold 14 and the movable mold 15 which vertically moves beneath the mold 14 bends only those end portions 11 and 12, of the cylindrical body 10 which are lapped one on the other so that they are bent inwards and flat by an angle $\theta$ from the tangential line passing the lowermost point of the circumference of the cylindrical body 10, as shown in FIG. 3. Bending the aforesaid end portions 11 and 12 flat is effective to prevent distortions which are otherwise occurrable therein in the succeeding processing steps, and contact-bonding the end portions 11 and 12 with minimized distortions can eventually minimize the internal strains to be built up in the bonded portion. Thus, such bonding of the end portions 11 and 12 plays an important role for suppressing a force due to spring-back occurring in the contact-bonding process in the final step.

In FIG. 3, 16 is a friction block which functions to push the cylindrical body 10 against the outer surface of the cylinder 1 when the cylindrical body 10 is transferred and bent.

Figure 4:
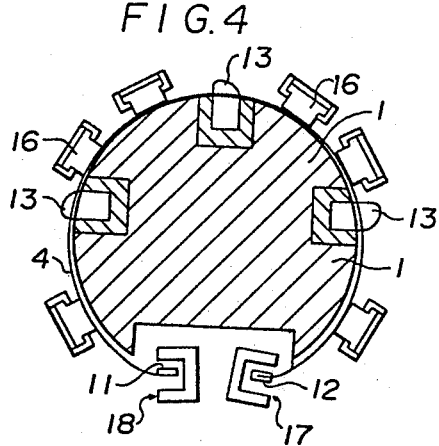
FIG. 4 is a section taken on the line IV—IV of FIG. 1.
Figure 5:
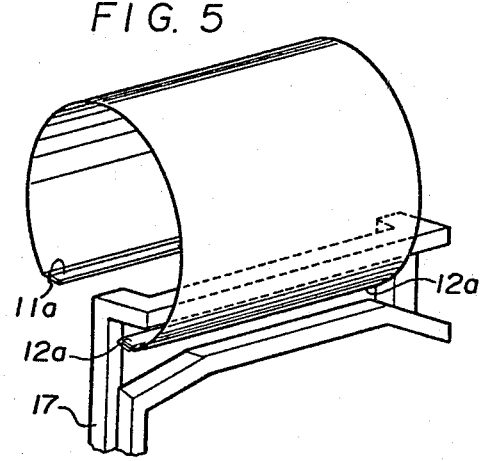
FIG. 5 is a schematic oblique view showing a structural relationship between a high-frequency induction heating coil and a can body blank heated thereby.

Then, the cylindrical body 10 is transferred to the heating section 300, where it is stopped and the adhesive films 2 and 3 attached onto the opposite ends 11 and 12 thereof are heated and melted by the high-frequency induction coils 17 and 18 shown in FIGS. 4 and 5.

As shown in FIG. 5, the heating coils 17 and 18 are configured in such a manner that the corner portions 11a and 12a of the opposite ends 11 and 12 are spaced apart from the coils by a larger gap than the gap at the center portions so that the true heat generated by coil portions corresponding to the corner portions 11a and 12a plus the heat due to edge effect is equal to the heat generated by the center portions of the coils for preventing the corner portions 11a and 12a from being overheated due to edge effect. In FIG. 5, the coil 18 is not shown.

Then, the cylindrical body 10 having its adhesive films 2 and 3 melted is transferred to the can body completing section 400 at the ending end of the cylinder 1 where it is finally formed into a can body.

Figure 6:
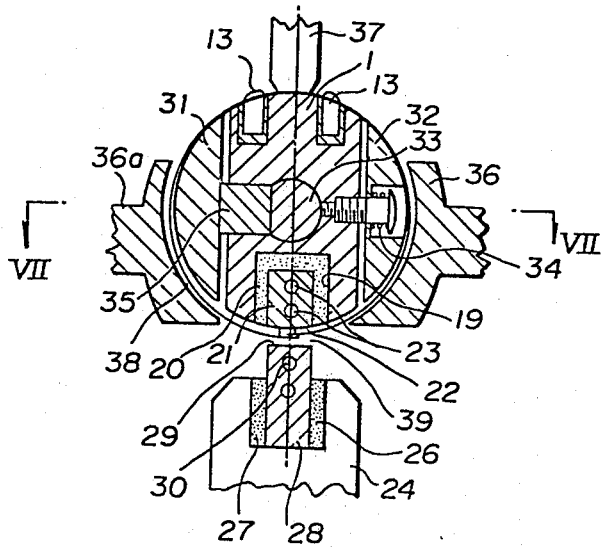
FIG. 6 is a section taken on the line VI—VI of FIG. 5.
Figure 7:
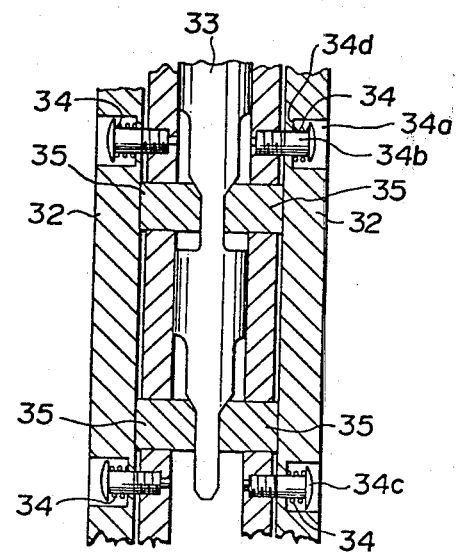
FIG. 7 is a section taken on the line VII—VII of FIG. 6.

The can body completing section 400 is arranged as shown in FIGS. 1 and 6 and as described previously. In this section, the cooling and pressure-receiving part 21 is always cooled to a temperature ranging from 5° C. to 10° C. by a coolant flowing through the through-hole 23 and its cooling action is exerted only radially.

Also, the aforementioned striking part 28 is always cooled to a predetermined temperature by a coolant flowing through the through-hole 30 provided therein.

As mentioned previously, the cylindrical body 10 having its adhesive films 2 and 3 melted is fed by the feeding pawls 13 into the spaces 38 and 39 constituting the contact-bonding section of the can body completing section 400. Then, it is formed into a predetermined cylinder by the lowering and pressing motion of the horn support, outward expanding motion of the semicircular parts 31 and 32 and the closing motion of the closing molds 36 and 36a interlocked with the semicircular parts 31 and 32 under the guidance of the outer periphery of the ending end of the cylinder 1. At the same time, the inwardly bent opposite flat ends 11 and 12 coated with the adhesive films 2 and 3 are lapped one on the other. Upon being lapped, the melted adhesive films on the opposite ends 11 and 12 are struck against the cooling and pressure-receiving part 21 to be cooled, bonded and cured, thus completing a can body.

As described herein-before, the cylinder 1 is not forcibly-cooled throughout the entire processes from the forming section 100 and can body completing section 400, excepting the lower side of its ending end and is exposed to the atmospheric temperature in a state leaving it as it is naturally cooled. Since the aforementioned can body forming, bending, heating, completing and bonding steps are effected under the guidance of the cylinder under these conditions, neither the surface of the cylinder 1 nor the adhesive films 2 and 3 do not undergo frost or dew deposition at any processing steps.

Therefore, the working conditions can be set without taking account of the existence of moisture.

According to the present invention having an arrangement and effects as described hereinbefore, cooling action is exerted externally radially only at the cooling and pressure-receiving part on the underside of the ending end of the cylinder and other parts of the cylinder are exposed to the atmosphere to avoid frost and dew deposition thereon and on the adhesive films. Thus, bubbles in the adhesive layers lowering the bonding strength can be prevented. Therefore, separation of the bond in the can end seaming process and formation of fine through-holes in the rolled portions causing leakage of the content can be effectively prevented.

Further, since the center portion of the can body blank is not forcibly-cooled when the opposite ends are heated, the temperature difference between these is far smaller than that appearing in the prior art method. Thus, the opposite ends of the can body blank are not subjected to undulated strain and uniform bonding of the seam can be assured.

Finally, it is obvious that according to the present invention substantially the same effects as those achievable in the can body forming process of inverted type as disclosed in the Japanese Laid-open Patent Application No. 51-120,885 can be also achieved in the can body forming method of rolled form type. Besides these, elimination of forced cooling of the blank and absence of moisture on the adhesive films minimizes the loss of electric power for heating.

What is claimed is:
1. A process for forming a can body comprising:
forming into a roughly cylindrical shape a can body blank having the opposite ends thereof coated with adhesive films of thermoplastic organic polymer under the guidance of a cylinder kept at an atmospheric temperature, bending inwardly said opposite ends into flat ends, transferring the thus formed can body blank along said cylinder to a succeeding position, melting by high-frequency induction heating said adhesive films coated on said opposite ends of said blank placed at said succeeding section while avoiding overheating the corner portions of said blank, transferring said blank to one end of said cylinder while said adhesive films are in a melted state, placing said can body blank in a can body contact-bonding section defined by said one end of said cylinder and a pair of pushing members which are moved oppositely to and from each other laterally of said cylinder, forming said roughly formed can body blank into a predetermined cylinder under the guidance of the outer periphery of said one end of said cylinder by the closing motions of said pushing members in such a manner that said flat opposite ends are lapped one on the other, cooling and bonding said adhesive films by striking in a spline portion in the lower part of said one end of said cylinder the thus lapped ends by a hammer having only its striking part cooled against a cooling and pressure-receiving part which exerts its cooling action only externally radially with said cylinder not otherwise being substantially cooled throughout its length except by room air, and retaining the thus struck state of said lapped ends for cooling and curing said melted adhesive films to complete a can body.

* * * * *